United States Patent Office 2,993,908
Patented July 25, 1961

---

2,993,908
PREPARATION OF CYCLIC ALKYLENE CARBONATES
Allen F. Millikan, Crystal Lake, and Gifford W. Crosby, River Forest, Ill., assignors to The Pure Oil Company, Chicago, Ill., a corporation of Ohio
No Drawing. Filed Dec. 16, 1958, Ser. No. 780,660
17 Claims. (Cl. 260—340.2)

This invention relates to an improved process for the production of alkylene carbonates by the reaction of oxirane compounds such as alkylene oxides, including ethylene and propylene oxides, for example, with carbon dioxide at elevated temperatures and pressures. More particularly, this invention relates to processes for the production of alkylene carbonates from oxirane compounds wherein a catalyst is employed for promoting the reaction.

Ethylene carbonate has been prepared from ethylene glycol by reaction with phosgene. The reaction of alcohols with phosgene produces the corresponding alkyl carbonate. Also, ethylene chlorohydrin, when reacted with alkali metal carbonates or bicarbonates, produces ethylene carbonate. Several research workers have suggested catalysts for the reaction of oxirane compounds with carbon dioxide. Such catalysts as sodium hydroxide on activated carbon, pyridine, and amines have been included in this work. These prior art methods are deficient for a number of reasons, including the danger of explosions, poor yields, or contaminated products.

It is an object of this invention to provide a catalytic process for producing alkylene carbonates by the reaction of oxirane compounds with carbon dioxide wherein the reaction is facilitated, product purity is improved, and yields are increased.

It is another object of the invention to provide a process for the preparation of alkylene carbonates from oxirane compounds by catalytic reaction with carbon dioxide in the presence of urea salts, hydrocarbyl-substituted urea salts, or hydrocarbyl-urea hydrohalides.

A further object of this invention is to provide a process for the production of alkylene carbonates from alkylene oxides through reaction with carbon dioxide in the presence of salts of urea or hydrocarbyl-substituted urea, formed with hydrohalic acids and using a small amount of said urea salt.

Other objects and features of this invention will be apparent from the following description.

In accordance with this invention, the alkylene oxides which are reacted with carbon dioxide are those of the oxirane system and have the general structural formula:

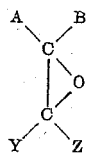

in which A, B, Y and Z represent hydrogen or hydrocarbyl groups containing from 1 to 20 carbon atoms and in which any two of the groups A, B, Y and Z may be interconnected to form, with one or two of the carbon atoms shown in the formula, a carbocyclic ring.

Suitable oxirane compounds to be used as the beginning reactant of this invention include ethylene oxide, cyclohexylethylene oxide, propylene oxide, 1,2-epoxybutane, 2,3-epoxybutane, 1,2-epoxyhexane, epoxyisobutylene, 1,2-epoxyhexadecane, cyclohexene oxide, epoxycyclohexene, styrene oxide, methylenecyclohexane oxide, cyclopentene oxide, cycloheptene oxide, and similar compounds having a three-membered oxirane ring.

Urea and hydrochloric acid are reported to react in the following manner:

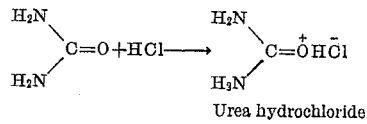

Urea hydrochloride

Once formed, the cation resonates thus:

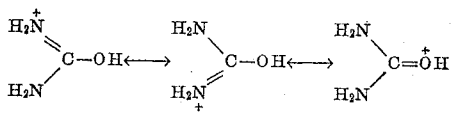

Urea hydrochloride thus is partially an oxonium salt, and is clearly distinguished from ammonium salts where the proton forms a covalent bond with nitrogen, thereby centering the positive charge about the nitrogen.

Neither urea nor hydrochloric acid by itself is an effective catalyst for the preparation of ethylene carbonate from ethylene oxide and carbon dioxide. When urea was used in an experiment comparable to one of the examples described below, there was only a 26% yield of crude product; when hydrochloric acid was tested as a catalyst in a comparable experiment, there was only a 7% yield of crude product; and in another comparable experiment with no catalyst, the yield was less than 5%.

It has been discovered that urea salts formed with hydrohalic acids, that is, urea hydrochloride, urea hydrobromide, urea hydrofluoride and urea hydroiodide, are exceptionally effective catalysts for the preparation of alkylene oxides. In view of the indifferent ability of either urea or hydrochloric acid alone to act as a catalyst for the reaction, the effectiveness of this class of urea salts, e.g. urea hydrochloride, is considered to be even more remarkable.

The urea salts used in accordance with this invention include, in addition to the urea hydrohalides, the alkyl-, aryl-, alkaryl-, and aralkyl-substituted urea hydrohalides all coming within the general formula:

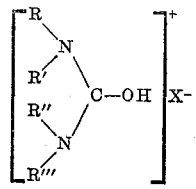

showing the cation and anion configurations, wherein R, R', R'' and R''' may be hydrogen, alkyl, aryl, aralkyl, and alkaryl groups containing up to 10 carbon atoms, provided no more than one aryl, or alkaryl group is present in the molecule, and X is a halogen. Thus where R, R', R'' and R''' are hydrogen, the formula defines the unsubstituted urea hydrohalide salts aforementioned as being particularly effective catalysts.

Where one R group is an alkyl radical and the balance, i.e. R', R'' and R''', are hydrogen, the formula covers the sub-genus of alkylurea hydrohalides. Species thereunder include:

Methylurea hydrochloride
Methylurea hydrobromide
Methylurea hydroiodide
Methylurea hydrofluoride
Ethylurea hydrochloride
Ethylurea hydrobromide
Ethylurea hydroiodide
Ethylurea hydrofluoride
Propylurea hydrochloride
Butylurea hydrobromide Isobutylurea hydroiodide
Pentylurea hydrofluoride
Hexylurea hydrochloride
Octylurea hydroiodide In the general formula, the dialkyl-substituted urea hydrohalides, having two alkyl groups attached to one nitrogen atom, or an alkyl group attached to each nitrogen atom, would include:

N,N'-dimethylurea hydrobromide
N,N-dimethylurea hydroiodide
N,N'-methylethylurea hydrochloride
N,N-ethylpropylurea hydrofluoride
N,N'-propylbutylurea hydrobromide
N,N-dioctylurea hydrofluoride
N,N'-dinonylurea hydrochloride
N,N'-didecylurea hydroiodide The following tri- and tetraalkyl-substituted urea hydrohalide salts are also species under the general formula:

Trimethylurea hydrobromide
Triethylurea hydroiodide
Tetra-n-propylurea hydrofluoride
Tetra-isobutylurea hydrochloride Where R, R', R" and R'" in the general formula represent aryl, and alkaryl groups, it is intended that only one such substituent be present. Thus in this sub-genus the following are included:

α-Naphthylurea hydrobromide
β-Naphthylurea hydrochloride
N-methyl-N'-phenylurea hydrofluoride
N-octyl-N'-naphthylurea hydrobromide
3,5-xylylurea hydrobromide
Phenylurea hydrochloride The following examples describe the invention in more detail.

*Example I*

Urea hydrochloride was prepared from 6.0 g. (0.10 mole) of urea and 10.3 g. (0.106 mole of HCl) of concentrated hydrochloric acid (37%). The resulting solution was clear, did not fume, and was calculated to be 59% urea hydrochloride. Approximately 0.3 g. of the urea hydrochloride solution so prepared and 17.4 g. of chilled ethylene oxide were charged to a chilled autoclave of 100 ml. capacity. The autoclave was pressured to 500 p.s.i.g. with carbon dioxide, and was agitated by rocking. Heat was applied as rocking continued, bringing the temperature to 435° F. in 45 minutes. The temperature was maintained at 435° F. for four hours and the autoclave was rocked throughout the period. During this time, a maximum pressure of 2500 p.s.i.g. was attained, but at the end of the period the pressure had dropped to 1200 p.s.i.g. There were 32.7 g. (94% yield) of crude product, and 28.5 g. of refined product (87% yield) was recovered by recrystallization from toluene. The refined product had a M.P. of 93° F. The melting point reported for commercial ethylene carbonate is 97° F. This experiment was repeated, and resulted in comparable yields of crude and refined ethylene carbonate.

*Example II*

Urea hydrobromide is prepared from 6.0 g. (0.10 mole) of urea and 17.0 g. (0.1 mole of HBr) of concentrated hydrobromic acid (48%) as in the procedure outlined in Example I. About 0.3 g. of the urea hydrobromide solution so prepared and about 18 g. of chilled ethylene oxide are charged to a chilled autoclave of 100 ml. capacity. The autoclave is pressured to 500 p.s.i.g. with carbon dioxide, and is agitated by continuous mechanical rocking. Heat is applied during agitation to bring the temperature to about 435° F. in about 45 minutes. The temperature is maintained at about 435° F. for four hours and the autoclave is mechanically agitated during this period. A maximum pressure of about 2500 p.s.i.g. is attained during the four-hour period and at the end of the period the pressure subsides to about 1200 p.s.i.g. The product ethylene carbonate is recovered in good yields.

*Example III*

Urea hydroiodide is prepared from 6.0 g. (0.10 mole) of urea and 25.6 g. (0.1 mole of HI) of concentrated hydroiodic acid (50%) as in the procedure outlined in Example I. About 0.3 g. of the urea hydrochloride solution so prepared and about 18 g. of chilled ethylene oxide are charged to a chilled autoclave of 100 ml. capacity. The autoclave is pressured to 500 p.s.i.g. with carbon dioxide, and is agitated by continuous mechanical rocking. Heat is applied during agitation to bring the temperature to about 435° F. in about 45 minutes. The temperature is maintained at about 435° F. for four hours and the autoclave is mechanically agitated during this period. A maximum pressure of about 2500 p.s.i.g. is attained during the four-hour period and at the end of the period the pressure subsides to about 1200 p.s.i.g. The product ethylene carbonate is recovered in good yields.

*Example IV*

Urea hydrobromide is prepared from 6.0 g. (0.10 mole) of urea and 17.0 g. (0.1 mole of HBr) of concentrated hydrobromic acid (48%) as in the procedure outlined in Example II. About 0.3 g. of the urea hydrobromide solution so prepared and about 18 g. of chilled propylene oxide are charged to a chilled autoclave of 100 ml. capacity. The autoclave is pressurized to 500 p.s.i.g. with carbon dioxide, and is agitated by continuous mechanical rocking. Heat is applied during agitation to bring the temperature to about 435° F. in about 45 minutes. The temperature is maintained at about 435° F. for four hours and the autoclave is mechanically agitated during this period. A maximum pressure of about 2500 p.s.i.g. is attained during the four-hour period and at the end of the period the pressure subsides to about 1200 p.s.i.g. The product propylene carbonate is recovered in good yields.

*Example V*

The reaction described in Example I was carried out using no catalyst. The yield of ethylene carbonate was only about 1%.

It has further been determined by experiment that this catalytic ability does not reside in all oxonium salts. Although ethyl ether and hydrochloric acid form an oxonium salt thus:

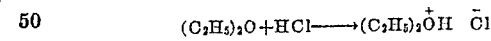

this oxonium salt does not act as a catalyst for the reaction of carbon dioxide and ethylene oxide to form ethylene carbonate. (The yield of crude product is less than 5%, as in the case of no catalyst.)

The amount of urea-salt catalyst required to carry out the process of this invention depends somewhat on the reaction conditions, but is usually within the limits of about 0.001 to 10% by weight, based on the amount of oxirane reactant. The catalyst concentration will vary as different temperatures, catalysts, contact times and pressures are used. Also, the solubility of the catalyst in any diluent or carrier for the reaction may vary. The catalyst may be dissolved in the oxirane reactant, or in a diluent, or it may be placed directly in the reaction zone, as a prepared solution, by suitable means for controlling the amount added. In certain instances it is undesirable to contact the catalyst with the oxirane compound in the absence of the carbon dioxide because this tends to promote side reactions and decreased yields of the desired glycol carbonates or alkylene carbonates.

This is a type of reaction wherein an induction period may be experienced in starting the reaction, particularly in the absence of a diluent. Such a condition may require the use of more catalyst. Induction periods may be reduced by adding to the reactant mass a small amount of the glycol carbonate product.

The reaction is carried out at a temperature of about 200° F. to 500° F. and preferably from about 300° to 450° F., under a pressure of about 100 p.s.i.g. to 1000, or as high as 3000 p.s.i.g. The reaction may be conducted either batchwise or continuously and in the presence or absence of an inert diluent. The catalyst may be continuously introduced in solution form along with the carbon dioxide and oxirane compound under the desired reaction conditions into an elongated reaction zone. Under these conditions, the products may be recovered from the effluent at the opposite end of the reaction zone. Preferred diluents or solvents for the reaction include dioxane, benzene, and crude glycol carbonates. In using the batchwise operation, portions of the oxirane compounds and the catalyst are introduced into a pressure-type reactor, carbon dioxide is introduced in amounts sufficient to build up the desired pressure, and the reaction mixture is agitated during the application of heat to the reaction temperature. In general, the reaction may be completed in about ½ hour to about 5 hours.

The proportions of oxirane compound and carbon dioxide are generally adjusted so as to provide an excess of carbon dioxide over the stoichiometric amount thereof required to react with all of the oxirane compound. The excess of carbon dioxide will, in general, vary from about 1% to 300%. In any event, it is necessary to avoid using an excess of oxirane compound, since these compounds tend to polymerize under pressures and may create an explosion hazard.

The reaction of this invention to produce cyclic alkylent carbonates or glycol carbonates and, more specifically, ethylene carbonate or 1,3-dioxolane-2-one may be carried out with or without a diluent which is non-reactive and acts to aid in temperature control. Such diluents as aromatic hydrocarbons, benzene, crude cyclic alkylene carbonates or dioxane may be used where temperature control becomes important. The reaction may be conducted in any suitable pressure vessel of the various types know to the art. The reactants may be brought together in any order and it is desirable that an excess of carbon dioxide be used to avoid polymerization.

The crude alkylene carbonates obtained may be purified by stripping off any low-boiling compounds. The components of the catalyst, namely urea and the hydrohalic acid, may be separately recovered and used to reform the catalyst, thus making the process continuous. The glycol carbonate may be purified by distillation under reduced pressure.

Ethylene carbonate, one of the species within this invention, melts at about 97° F. and has a boiling point of about 478° F. and at 760 mm. Hg. Ethylene carbonate is useful in syntheses, and also has good solvent properties for such substances as polyvinyl chloride and polyacrylonitrile. Ethylene carbonate has been used as a solvent for the extraction of aromatic hydrocarbons from mixtures containing same. It is also used as a source of carbon dioxide and as a stabilizer in ester-type synthetic lubricating oils.

Propylene carbonate is a liquid, melting at about −56° F. and having a boiling point of about 467° F. at 760 mm. Hg. Propylene carbonate is relatively stable at elevated temperatures. In general, it undergoes the same reactions as ethylene carbonate, e.g., the carbon-oxygen cleavage and ester interchanges.

From this description it is seen that the invention relates broadly to a process of producing alkylene carbonates by reacting an alkylene oxide with carbon dioxide in the presence of catalytic amounts of a urea salt and separating alkylene carbonates from the reaction mixture. A selected group of starting materials ranging from ethylene oxide to methylenecyclohexane oxide has been disclosed. Preferably, the urea salts are hydrohalic salts and preferred sub-geni include the hydrocarbyl-substituted urea hydrohalides and the unsubstituted urea hydrohalides. A large group of hydrocarbyl-substituted urea hydrohalides have been disclosed wherein the hydrocarbyl radicals may be alkyl radicals or various aryl, alkaryl, and aralkyl radicals. The alkyl portion of the alkaryl radicals and the aralkyl radicals may contain from 1 to 4 carbon atoms to include methylphenyl, ethylphenyl, propylphenyl, butylphenyl, phenylethyl, phenylmethyl, phenylpropyl and phenylbutyl combinations. The alkyl portion of these radicals may be branched or straight chain. Thus, the maximum number of carbon atoms for R, R', R" and R''' is about 40 and each R-group will contain no more than about 10 carbon atoms.

Various methods are available for preparing the symmetric ureas, and asymmetric ureas, for transformation into the hydrohalic salts to be used in accordance with this invention. To illustrate, a dialkylcarbamyl halide can be reacted with ammonia to form an N,N-dialkylurea,

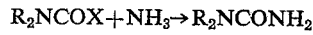

the product readily associating with a hydrohalic acid to form the salt. Since the method of preparing the catalysts of this invention are well known, no further explanation is necessary. The only limitations attaching to this invention appear in the appended claims.

What is claimed is:

1. The process for producing alkylene carbonates which comprises reacting an alkylene oxide with carbon dioxide at a temperature of about 200° to 500° F. and pressures above about 100 p.s.i.g. in the presence of a urea salt having the formula:

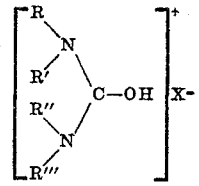

wherein R, R', R" and R''' are selected from the group of hydrogen, alkyl, aryl, alkaryl, and aralkyl hydrocarbon radicals containing 1 to 10 carbon atoms, X is a halogen, and no more than one radical from the group of aryl, and alkaryl radicals is present in the molecule.

2. The process in accordance with claim 1 in which between about 0.001 and 10% by weight of said urea salt is used, based on the weight of said alkylene oxide.

3. The process in accordance with claim 1 in which R, R', R" and R''' are hydrogen.

4. The process in accordance with claim 1 in which R, R" and R''' are hydrogen and R' is an alkyl radical containing 1 to 10 carbon atoms.

5. The process in accordance with claim 1 in which R and R" are hydrogen and R' and R''' are alkyl radicals having from 1 to 10 carbon atoms.

6. The process in accordance with claim 1 in which R, R" are hydrogen, R' is an alkyl radical having from 1 to 10 carbon atoms, and R''' is an aryl radical.

7. The process in accordance with claim 6 in which R''' is alkaryl.

8. The process in accordance with claim 6 in which R''' is aralkyl.

9. The process in accordance with claim 6 in which R''' is naphthyl.

10. The process in accordance with claim 1 in which the alkylene oxide is selected from the group of ethylene oxide, cyclohexene oxide, propylene oxide, butylene oxide, styrene oxide, diphenylethylene oxide, 1,2-epoxybutane, 2,3-epoxybutane, 1,2-epoxyhexane, epoxyisobutylene, 1,2-epoxyhexadecane, cyclopentene oxide, and methylenecyclohexane oxide.

11. The process in accordance with claim 1 in which said urea salt is urea hydrochloride.

12. The process in accordance with claim 1 in which said urea salt is urea hydrobromide.

13. The process in accordance with claim 1 in which said urea salt is urea hydroiodide.

14. The process of producing ethylene carbonate which comprises reacting ethylene oxide with carbon dioxide at a temperature of about 200° F. to 500° F. and pressures above about 100 p.s.i.g. in the presence of about 0.001 to 10% by weight of urea hydrochloride.

15. The process of producing ethylene carbonate which comprises reacting ethylene oxide with carbon dioxide at a temperature of about 200° F. to 500° F. and pressures above about 100 p.s.i.g. in the presence of about 0.001 to 10% by weight of urea hydrobromide.

16. The process of producing ethylene carbonate which comprises reacting ethylene oxide with carbon dioxide at a temperature of about 200° F. to 500° F. and pressures above about 100 p.s.i.g. in the presence of about 0.001 to 10% by weight of urea hydroiodide.

17. The process of producing propylene carbonate which comprises reacting propylene oxide with carbon dioxide at a temperature of about 200° F. to 500° F. and pressures above about 100 p.s.i.g. in the presence of about 0.001 to 10% by weight of urea hydrochloride.

References Cited in the file of this patent

UNITED STATES PATENTS

| | | |
|---|---|---|
| 2,667,497 | Cline | Jan. 26, 1954 |
| 2,773,070 | Lichtenwalter | Dec. 4, 1956 |

OTHER REFERENCES

Wertheim: "Organic Chemistry" (2nd ed., 1948) (The Blakiston Co., publishers), pp. 269–272.